UNITED STATES PATENT OFFICE.

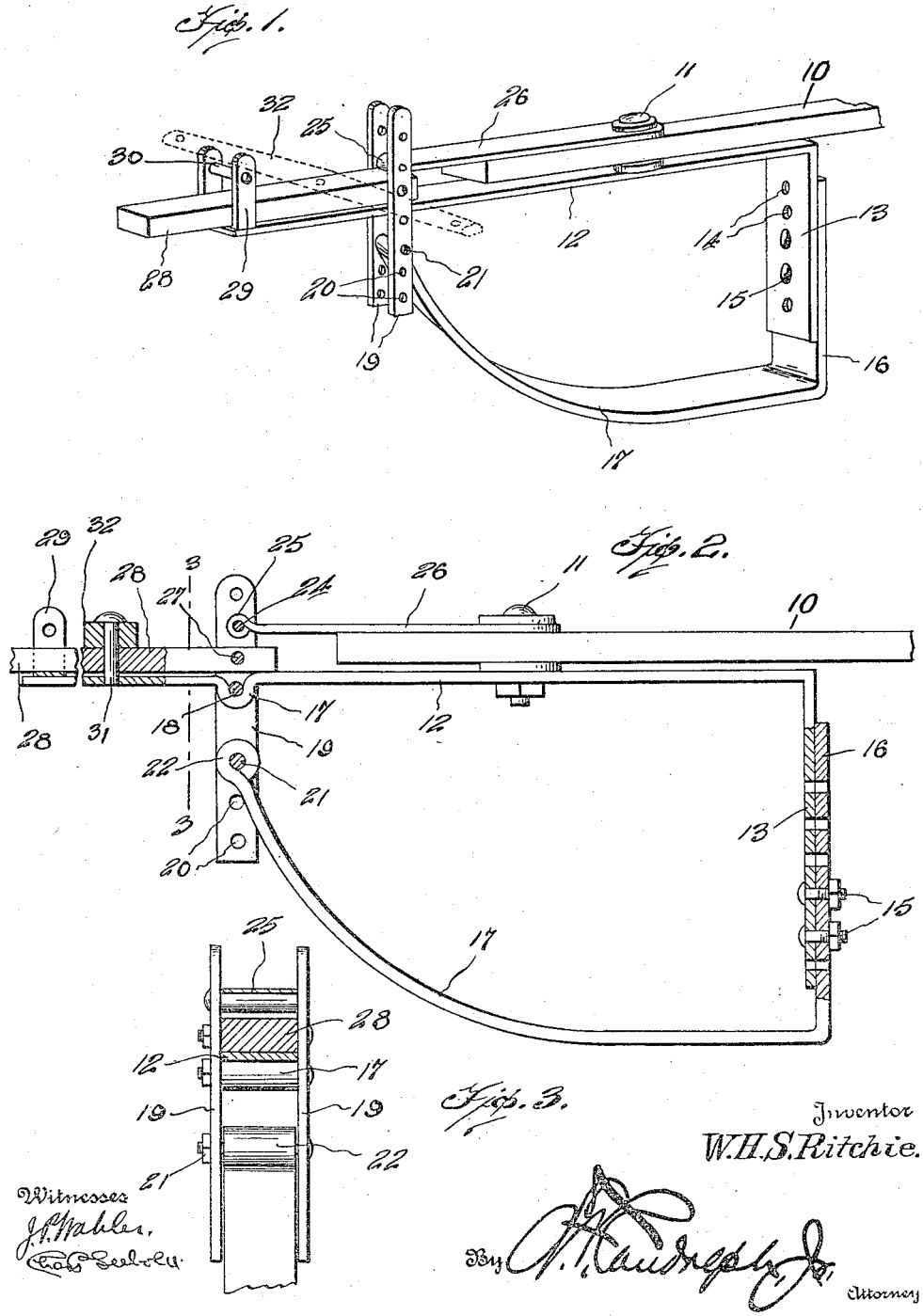

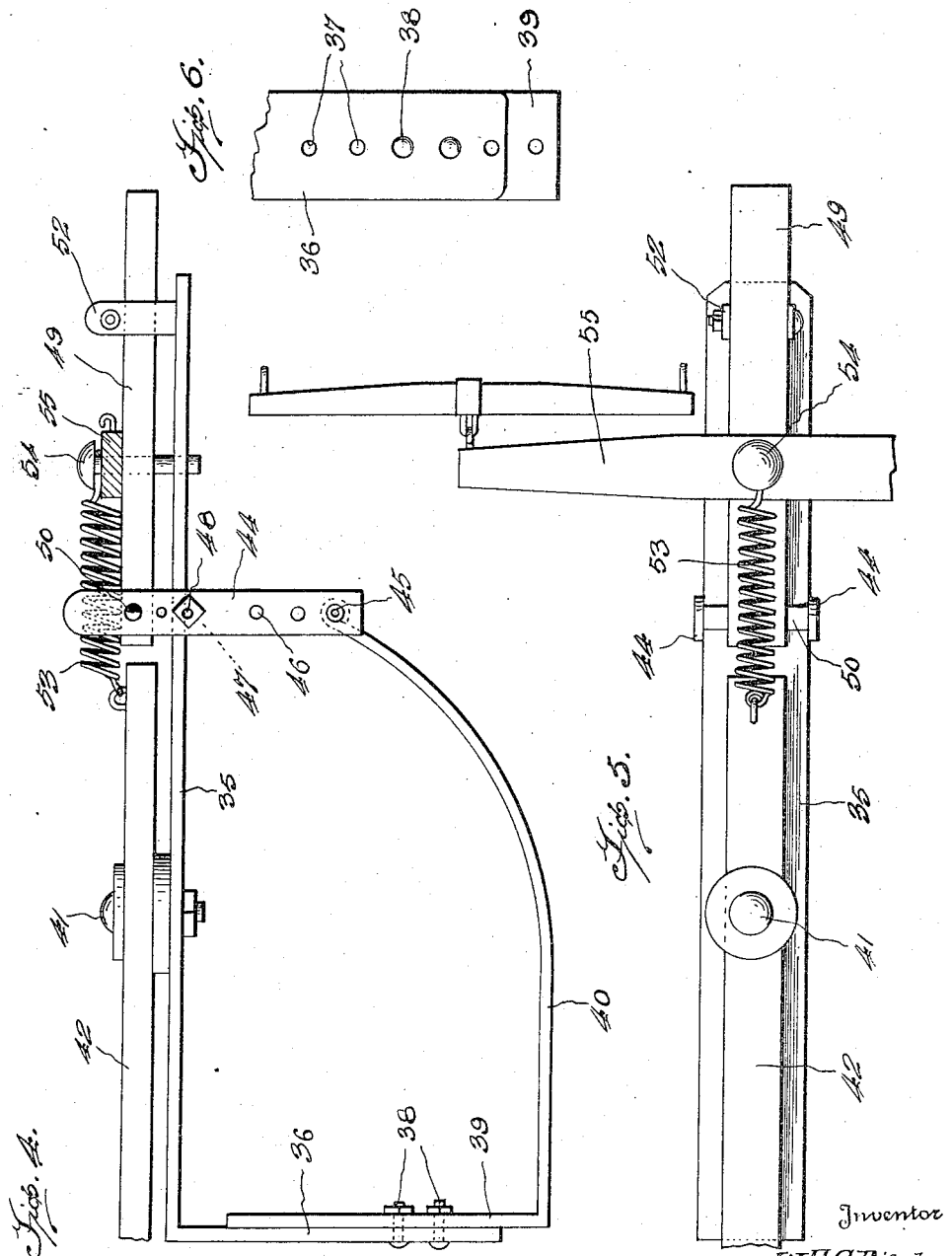

WILLIAM H. S. RITCHIE, OF WEST POINT, KENTUCKY.

RUNNER FOR DRAFT-TONGUES.

1,210,694.  Specification of Letters Patent.  Patented Jan. 2, 1917.

Application filed November 30, 1915. Serial No. 64,278.

*To all whom it may concern:*

Be it known that I, WILLIAM H. S. RITCHIE, a citizen of the United States, residing at West Point, in the county of Hardin and State of Kentucky, have invented certain new and useful Improvements in Runners for Draft-Tongues; and I do hereby declare the following to be a full, clear, and exact description of the invention, such as will enable others skilled in the art to which it appertains to make and use the same.

This invention has for its primary object to provide an improved and simplified runner for draft tongues for harrows, cultivators, wagons and all other classes of animal drawn vehicles or implements embodying draft tongues.

Another object is the provision of a supporting runner for draft tongues embodying means whereby the runner may be adjusted so as to support the draft tongue at any desired height above the ground.

With these and other objects in view, the invention consists in the novel construction, combination and arrangement of parts as will be hereinafter specifically described, claimed and illustrated in the accompanying drawings, in which:

Figure 1 represents a fragmental perspective view of the improved runner for draft tongues, Fig. 2 represents a side elevation thereof, partly in section, Fig. 3 represents a transverse sectional view on the line 3—3 of Fig. 2, Fig. 4 represents a side elevation of a modified type of the supporting runner for draft tongues, Fig. 5 represents a plan view, partly broken away, of the modified type illustrated in Fig. 4, and Fig. 6 represents a fragmental rear elevation thereof.

Referring to the drawings in detail, wherein similar reference numerals designate corresponding parts throughout the several views, the numeral 10 indicates generally the draft pole or tongue, which, as usual, is rigidly secured at its rear end to the harrow, cultivator, wagon or other vehicle or implement. The forward extremity of the draft tongue 10 is formed with an aperture receiving a pivot pin or king bolt 11 pivotally securing thereto the body plate 12 of the runner, having the angular depending rear end 13 formed with a plurality of spaced apertures 14 adapted to receive bolts 15, whereby the upwardly directed rear end 16 of the runner 17 is adjustably secured thereto. The body plate 12 extends a distance forwardly of the forward extremity of the draft tongue 10 and is formed adjacent its forward end with a crimp or loop 17 securing a bolt 18, which latter is engaged in apertures formed in a pair of vertically disposed connecting plates 19. The plates 19 are arranged upon opposite sides of the forward extremity of the body plate 12 and are formed in their lower portions with a plurality of spaced apertures 20, receiving a securing bolt 21 engaged through the looped forward extremity 22 of the runner 17 for adjustably securing the latter between the connecting plates 19.

The plates 19 project a distance above the body plate 12 and are connected by a bolt 24, engaged in the looped forward extremity 25 of a reinforcing bar 26, which latter is connected at its rear end with the pivot bolt 11.

A pivot bolt 27 is secured in the connecting plates 19 between the forward end of the reinforcing bar 26 and body plate 12 and pivotally secures thereto a relatively short tongue 28. The short tongue 28 is normally supported in horizontal position upon the forward extremity of the body plate 12 and is secured against lateral movement with relation to the body plate by a guide 29 of U-shape, having the upper free ends connected by a pin or bolt 30. The short tongue 28 is adapted to be connected at 31 with a preferred type of whiffletree 32.

Referring to the modification of the invention illustrated in Figs. 4 to 6, the numeral 35 indicates the body plate of the runner having an angular depending rear end 36 formed with a plurality of apertures 37 receiving bolts 38, whereby the angular upstanding end 39 of the runner 40 is adjustably secured thereto. Adjacent its rear extremity, the body plate 35 is pivotally connected by a bolt 41 with the draft tongue 42 and the forward looped end of the runner is adjustably connected between a pair of connecting plates 44 by a bolt 45 collectively engaged in any one of a plurality of pairs of apertures 46. The medial portion of the body plate 25 is formed with a loop 47 receiving a bolt 48 engaged in the connecting plates 44. A short tongue 49 is pivotally secured to the horizontally disposed pivot bolt 50 secured between the connecting plates 44 above the body plate 35 and the forward extremity thereof is movable vertically in a guide 52 secured to the forward extremity of the body plate 25. A spring 53 connects the forward extremity of the draft tongue 42 with the short tongue 49, the forward extremity of the spring 53 being secured by a bolt 54, which latter also secures a preferred type of whiffletree 55 to the stub tongue 49.

What is claimed is:

1. A device of the class described comprising a body plate, a draft tongue connected therewith, a runner secured to the rear extremity of the body plate, adjustable means connecting the forward extremity of said runner with said body plate, a short tongue, and means securing the short tongue to said adjustable means.

2. A device of the class described comprising a body plate having an angular rear end, a draft tongue connected therewith, a runner, means adjustably securing the rear extremity of said runner with the angular end of said body plate, adjustable means securing the forward extremity of said runner with said body plate, and a short tongue connected with said adjustable means.

3. A device of the class described comprising a body plate, a runner supporting said body plate, means for pivotally securing a draft tongue to said body plate, a short tongue connected with said body plate, and spring means connected with the rear extremity of the short tongue and connected with the draft tongue.

In testimony whereof I affix my signature in presence of two witnesses.

WILLIAM H. S. RITCHIE.

Witnesses:
EUGENE M. WRIGHT,
ABEL W. APPLEGATE.

Copies of this patent may be obtained for five cents each, by addressing the "Commissioner of Patents, Washington, D. C."